_United States Patent_ [19]

Edinborgh

[11] 3,778,552
[45] Dec. 11, 1973

[54] PERSONAL SOUND MONITOR
[75] Inventor: Julius A. Edinborgh, Spring, Tex.
[73] Assignee: Shell Oil Company, Houston, Tex.
[22] Filed: Sept. 27, 1972
[21] Appl. No.: 292,593

[52] U.S. Cl. .............................................. 179/1 N
[51] Int. Cl. ............................................. G01h 5/00
[58] Field of Search ........................... 179/1 N, 1 P;
181/0.5 AP, 0.5 G

[56] References Cited
UNITED STATES PATENTS
3,713,112  1/1973  Heidenreich ...................... 179/1 N
3,696,206  10/1972  Ida ..................................... 179/1 N
3,280,937  10/1966  Faber ............................. 181/0.5 AP OTHER PUBLICATIONS
Glietsch, A Computerized Aircraft Noise Monitoring System, Proceeding of the 16th International Symposium on Aerospace Instrumentation, 5/1970, p. 288–293.

Primary Examiner—William C. Cooper
Assistant Examiner—Jon Bradford Leaheey
Attorney—Theodore E. Bieber et al.

[57] ABSTRACT

A personal sound monitor wherein the sound is detected by a microphone and converted to a related electrical signal. The level of the signal is used to gate one of the plurality of levels in a scanning digital counter, the levels corresponding to various predetermined sound levels. The scanning counter controls the gating of various frequencies to an accumulating counter so that the total count is proportional to the integrated sound level to which the individual has been exposed.

10 Claims, 3 Drawing Figures

TO FIG. 1B    TO FIG. 1C

PERSONAL SOUND MONITOR

BACKGROUND OF THE INVENTION

The present invention relates to a personal sound monitor that may be worn by an individual subjected to abnormally high sound levels. Recently the government has established the duration to which a person may be exposed to various sound levels. For example, the following table appears in the Walsh-Healy Act and regulations of the Office of Health and Safety and sets forth the permissible limits.

TABLE

| Duration Per Day, Hours | Sound Level DBA Slow Response |
| --- | --- |
| 8 | 90 |
| 6 | 92 |
| 4 | 95 |
| 3 | 97 |
| 2 | 100 |
| 1½ | 102 |
| 1 | 105 |
| ½ | 110 |
| ¼ | 115 |

The Act further limits the total permissible exposure to the sum of the fractions of the total time of an exposure at a specified sound level divided by the total time of exposure permitted at that level. When the sum of the fractions exceeds unity one has been exposed to the maximum permissible sound or noise for the day. Further, the Act limits the exposure to impulsive or impact sound to a level not to exceed 140 db peak sound.

Various devices have been developed for monitoring the sound levels but these are basically analog devices. They merely indicate the level of the sound and make no attempt to obtain an integrated quantity as required by the Act. While some of the monitors convert the analog signal to a digital number and record the digital number these devices also integrate sound levels below the 90 db level which are not restricted by the Act. Further, these prior art devices make no provision for indicating when an individual is exposed to an impulsive sound level that exceeds 140 db.

BRIEF SUMMARY OF THE INVENTION

The present invention solves the above problems by providing a personal monitor that utilizes a piezoelectric microphone to convert the sound waves to an electrical signal. The electrical signal is used to gate a scanning digital counter to select an appropriate channel where the various channels correspond to the audio levels defined by the Walsh-Healy Act. When the proper channel is selected the counter is stopped and a gate opened to transmit a selected pulse frequency to an accumulating counter. Thus the accumulated count is the integrated sound level to which the wearer has been exposed. The pulse frequencies are selected to correspond to the various sound levels set by the Act.

The counter is scanned at a fixed rate so that when the sound level has decreased below the minimum value no gate is opened and no counts will be accumulated.

In addition, to accumulating the product of sound level and duration to which the wearer has been exposed, the monitor also includes alarm circuits. One alarm circuit is set to trigger whenever the wearer is exposed to more than 140 db audio level for even a short time. The second alarm circuit is set to trigger whenever the wearer is exposed to a sound level above 117 db for a relative short time.

BRIEF DESCRIPTION OF THE DRAWING

The present invention will be more easily understood from the following detailed description of a preferred embodiment when taken in conjunction with the attached drawing FIGS. 1A, B and C showing in schematic form a circuit of the monitoring device.

PREFERRED EMBODIMENT

Figure 1A:
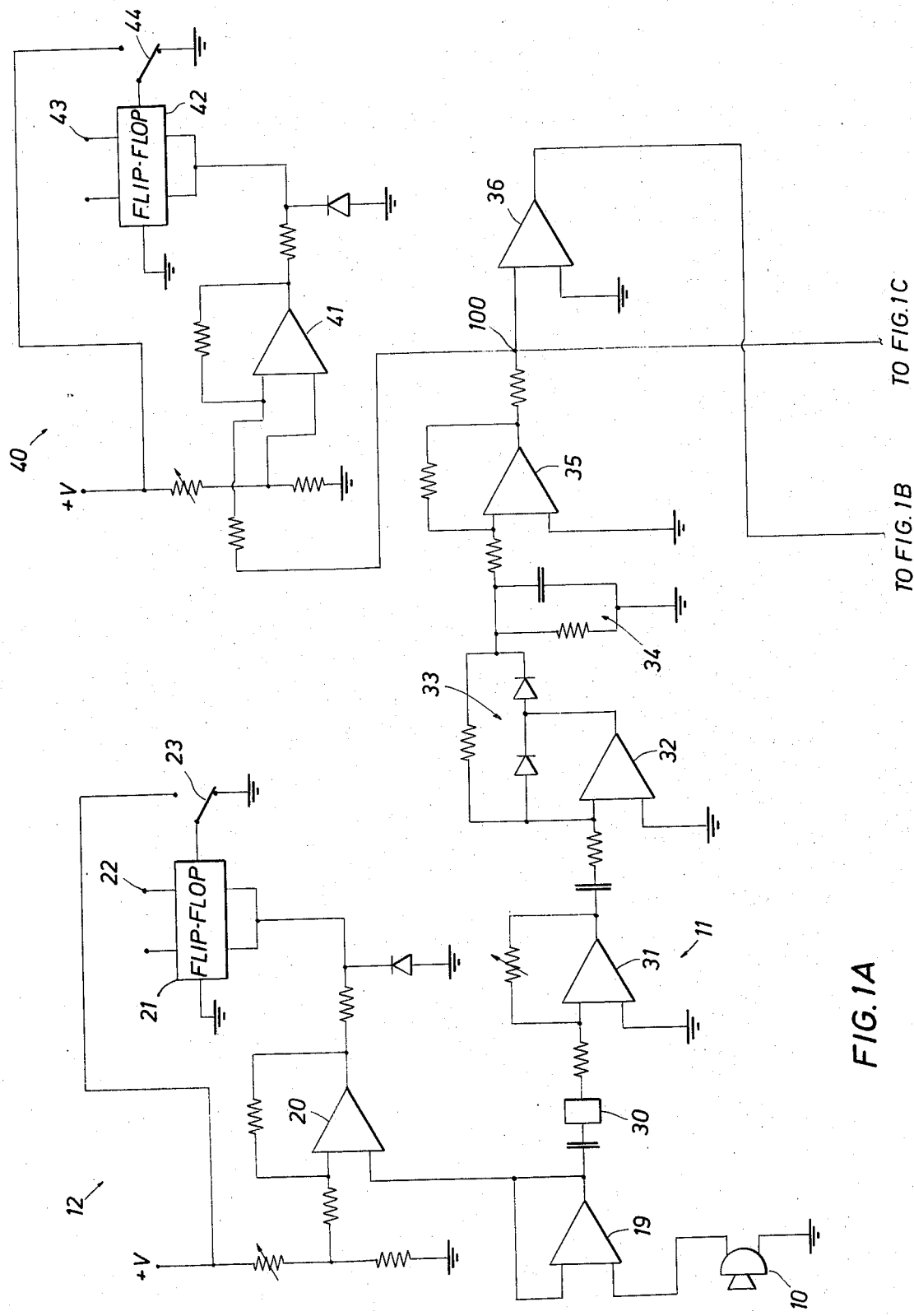
Figure 1B:
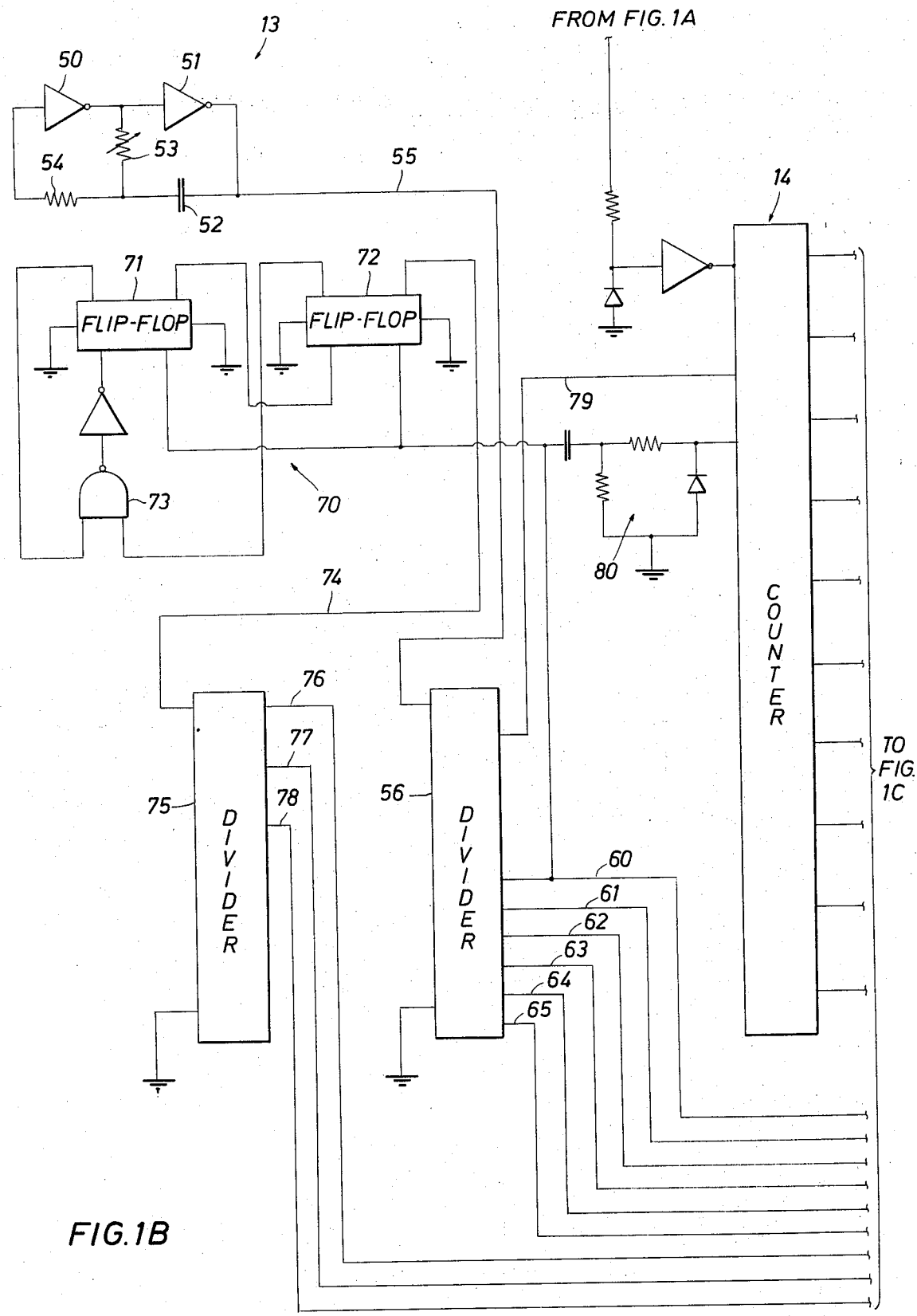
Figure 1C:
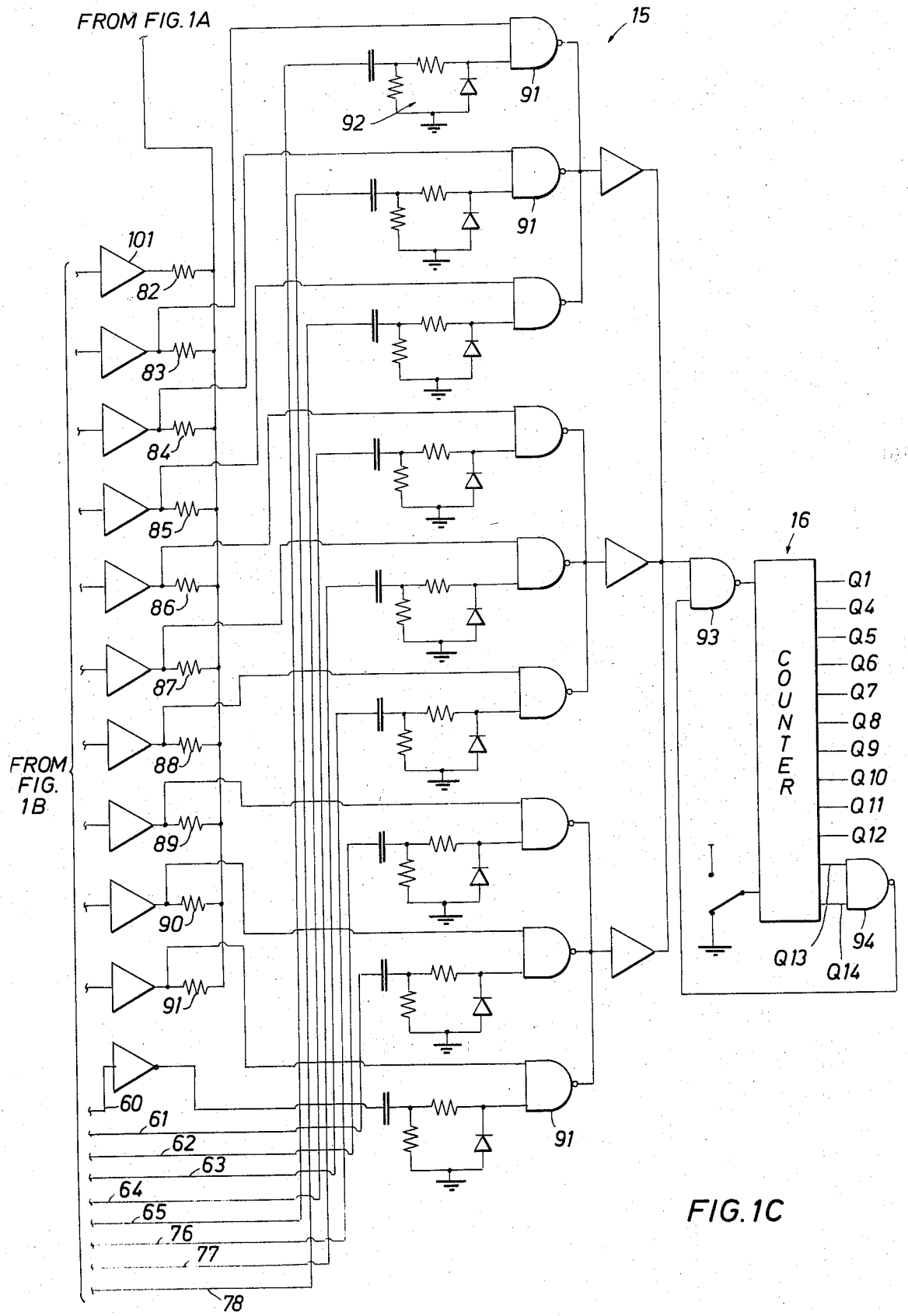

Referring to the enclosed drawing there is shown a piezoelectric microphone 10 that is coupled to an amplifying circuit 11. Also coupled to the amplifying circuit is the external alarm 12 that is set to trigger whenever the instantaneous sound level exceeds 140 db. The output of the amplifying circuit is related to the sound level and is transmitted to the input of a comparator 36. The comparator is also fed by the decade counter 14 which functions as a multiplexer that selects one of a series of channels with the channels corresponding to the various sound levels. The selected channel actuates one of a series of gates 15 to pass one of several frequencies from an oscillator 13 to the accumulating counter 16. The various frequencies are selected to correspond to the sound levels set forth in the act so that the accumulated counts will correspond to the permissible accumulated sound to which a person may be exposed. The counter 16 is provided with provision for reading the accumulated count by running the counter backwards into a second external counter which will display the accumulated counts.

As explained above, the frequencies generated by the oscillating circuit are selected to correspond to the various sound levels so that when they are accumulated they will give a true integration of the total sound to which the wearer has been exposed. For example, if one desired to accumulate 1,000 counts in a fifteen minute period at the 115 db sound level, then the required frequency would be 1,000 divided by 15 × 60 or a frequency of 1.11 hz. From an inspection of the above table, it is easily seen that in addition to the basic frequency the following fractions of the basic frequency will be required: ½; ¼; 1/6; ⅛; 1/12; 1/16; 1/24; and 1/32. Thus, in addition to the basic frequency, the frequency must be divided by 3 in order to obtain some of the fractions while the remaining fractions can be obtained by merely dividing the basic frequency or fractions thereof by 2.

The microphone 10 is coupled to an impedance matching amplifier 19 that matches the impedance of the microphone with both the alarm circuit 12 and the remaining stages of amplification. The external alarm circuit comprises a second stage of amplification 20 that is coupled to both inputs of a flip-flop circuit 21. Thus whenever the amplifier signal exceeds the level required for triggering the flip-flop, the flip-flop will flip to its on state. The state of the flip-flop may be determined by coupling its terminal 22 to an external circuit. In addition, the terminal 22 may be coupled to a visual indicating device or audiable alarm which would appraise the wearer that he has been subject to a sound level of over 140 db. In order to obtain substantially instantaneous operation of the circuit 12, the time constant of the circuit is made relatively short. A switch means 23 is provided for resetting the flip-flop to its original state by removing the ground connection from the "reset" input of the flip-flop.

The output of the impedance matching amplifier 19 is also coupled to a filter 30 that is designed to weight the amplitude of the signal, according to the "A" scale weighting set forth in the act and defined by American National Standard Institute specification S 1.4–1971 for personal sound meters. The output of the filter is connected to a gain amplifier 31 which is designed to saturate just above the 117 db sound level, so that it easily covers the range 88 to 117 db. The amplified signal is rectified by a rectifying circuit that includes amplifier 32 and diodes 33 disposed in the feedback circuit of the amplifier. The rectified signal is smoothed by a filtering circuit 34 which also provides the time constant for the "slow dynamic characteristic" required by the act and defined in ANSI S1.4–1971. The signal is supplied to an impedance matching amplifier 35 the output of which is supplied to a second external alarm circuit 40 and the comparator 36. The second external alarm circuit comprises an amplifier 41 and a second flip-flop 42. This circuit is set to trigger when the sound level exceeds 117 db for a relatively long time period. Thus the time constant of the circuit should be approximately 0.5 sec. while the time constant of the circuit 12 is less than 0.1 sec.

The oscillator 13 comprises amplifiers 50 and 51 having feedback resistances 53 and 54 and a capacitor 52. The values of the resistances and capacitor are chosen so that the output frequency of the circuit is equal to approximately 2,048 times the basic frequency for 2,273 hz. This frequency is supplied to a dividing circuit 56 which supplies on the leads 60–65 some of the required frequencies or 16$f$, 8$f$, 4$f$, 2$f$, $f$, and $f/2$, respectively. These frequencies are sixteen times the frequencies set for the above. Thus the counter will accumulate 16,000 counts when the wearer has been exposed to maximum amount of sound in a day. The frequency appearing on the lead 60 corresponding to 16$f$ is supplied to the divide by three circuit 70. This circuit comprises two flip-flop circuits 71 and 72 and a gate circuit 73. The gate circuit controls the operation of the flip-flop 71 whose output in turn controls the operation of the flip-flop 72. This circuit will transmit every third pulse that it receives and the frequency on lead 74 will be 16$f$/3. This frequency is supplied to a second dividing circuit 75 which supplies frequencies on the leads 76, 77, and 78 corresponding to 8/3$f$; 4/3$f$; and 2/3$f$, respectively.

The multiplexing circuit 14 is a decade counter-decoder supplied with a frequency on the lead 79 equal to 512$f$ to clock a scanning cycle gated by a high output of comparator 36 and reset by a pulse appearing on the lead 60 having a separation rate of 16$f$. This frequency is differentiated by the circuit 80 so that a sharp pulse is supplied to the counter to reset it.

The scan of the decade counter is gated on by the high output of comparator 36 and causes each of drivers 81 to be energized one at a time from the 5 volt power supply. This produces positive currents through resistors 82–91 in sequence. The positive current from the resistances is supplied to the junction point 100 at the input to the comparator 36. The positive current at point 100 is opposed by the negative current from impedance matching amplifier 35 that represents the sound level. When a selected resistor is low enough that its positive current exceeds the negative current flowing from amplifier 35 the output of comparator 36 goes low, inhibiting the clock line and enabling the gate 91 associated with the resistor until the next scan is initiated. The negative current produced from amplifier 35 is proportional to its output voltage which is proportional to the sound level. The resistances 82–91 are selected so that they correspond to the various sound levels set forth above. For example, the following series of resistances could be used when the signal at the output of the amplifier 35 varies between 0.110 and 2.38 volts: 1.36m; 1.11m; 9m; 630k; 501k; 351k; 282k; 298k; 222k; and 63k. The resistances are all powered from a 5 volt power supply that is part of the decade counter 14. The drivers 101 are coupled to a series of gate circuits 91 which also receive the frequencies generated by the dividing circuits 56 and 75. The frequency pulses are differentiated by a series of circuits 92 at the input of each of the gate circuits. Thus when one of the gates is opened by the signal from the multiplexer, it will pass a group of pulses from the appropriate frequency to the gate circuit 93. The gate circuit 93 in turn is opened by the gate 94 to pass the pulses to the up-down counter 16. As explained, the up-down counter 16 will accumulate the counts and can then be interrogated by supplying pulses to down count it to zero and to up count an external counter to determine the total count on counter 16. Gates 93 and 94 prevent the counter from turning back to zero by stopping the count when both Q13 and Q14 go high.

During the periods when the sound level is below 88 db, the decade counter 14 resets to the 88 db level but since the positive current from that driver exceeds the negative current from amplifier 35, the output of comparator 36 is low and the scan is not gated; no pulses are gated through gates 91 and the count in counter 16 remains constant until the sound level again rises to 90 db or greater.

Pulse trains having frequencies of $f/2$ to 16$f$ are differentiated and gated through to counter 16. Scanning is initiated by the leading edge of each 16$f$ pulse and is finished much before the trailing edge occurs. The pulse train at 16$f$ is inverted, differential and applied to its associated gate 91. Pulse trains of 8$f$ and lower in frequency are differentiated and applied to the appropriate gates without inversion. A timing diagram of all gate inputs and of the scanning cycle show that there is no coincidence and therefore no interference of the scanning operation and the differentiated pulses of any pulse train. Since the multiplexer is reset at a frequency 16 times the basic frequency this means the multiplexer will scan the amplitude of the sound level approximately 18 times per second. This insures an accurate integration of the total sound to which the wearer has been exposed.

While the above description has related to the use of individual components to perform the various functions, obviously integrated circuits of the MOSFET type could be used to perform the same functions. This would permit packaging of the device in a relative small unit so that it could be easily worn by an individual. Even without the use of integrated circuits integrated components in the form of amplifiers and dividing circuits and counting circuits could be utilized so that the physical dimensions of the device are still relatively small.

We claim as our invention:
1. A personal sound monitor comprising:

microphone means for detecting the sound and converting the detected sound to an electrical sound signal whose amplitude is proportional to the amplitude of the sound;

an oscillator means, said oscillator having a plurality of terminals for supplying a plurality of electrical pulses having predetermined frequencies;

a scanning means, said microphone means being coupled to said scanning means, said scanning means having a plurality of terminals corresponding to a preset plurality of electrical signal levels and means for comparing said electrical sound signal with said preset electrical levels;

a plurality of gate means, each of said gate means being respectively coupled to an individual terminal on said oscillator and an individual terminal on said scanning means;

and an integrating means, all of said gate means being coupled to said integrating means whereby said integrating means will integrate the pulses passed by said gate means.

2. The sound monitor of claim 1 and in addition a memory circuit coupled to said microphone to detect when the sound level exceeds a preset value and store an indication said occurrence.

3. The sound monitor of claim 2 wherein said memory circuit comprises a flip-flop circuit having a relative short time constant and whose trigger level corresponds to the preset value of the sound level.

4. The sound monitor of claim 1 wherein said scanning means comprises a decade counter having a plurality of resistances coupled to its output terminals, one said resistances being supplied for each signal level, said decade counter supplying a second electrical signal of opposite polarity to the polarity of said first mentioned electrical signal to all of said resistances in sequence, a plurality of gate circuits being associated with each of said resistances, said gate circuits being disposed to open when the electrical signal across a resistance exceeds the amplitude of the first mentioned electrical signal.

5. The sound monitor of claim 1 wherein said integrating means comprises a counter having means for returning said counter to zero by application of pulses from an external source.

6. The sound monitor of claim 5 and an additional means for stopping the operation of said integrating counter wherever said integrating counter saturates.

7. The sound monitor of claim 4 wherein said second electrical signal is a constant voltage signal and a comparing circuit compares the current flow from each resistance with the current flow of said first electrical signal, said comparing circuit opening the gate of the resistance whose current flow is less than the current flow of said first signal.

8. The sound monitor of claim 7 wherein said decaded counter samples the current flow in said resistances in sequence with the highest value resistance being sampled first and the lowest value being sampled last.

9. The sound monitor of claim 4 wherein said decade counter is triggered at a preset frequency to sample the electrical signal across said resistances, the sampling rate of said decade counter being controlled by a clock pulse.

10. The sound monitor of claim 1 wherein said preset signal levels correspond to established sound levels and the difference between said predetermined frequencies corresponding to uniform differences in decibels in the sound level.

* * * * *